April 24, 1956 — L. A. LA FOND — 2,742,850
APPARATUS FOR COOKING AND SERVING FOODS
Filed March 25, 1953 — 2 Sheets-Sheet 1
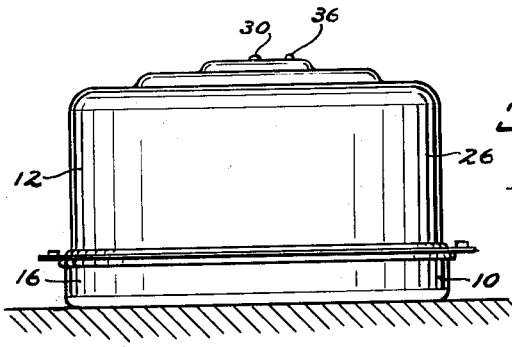
FIG. 1
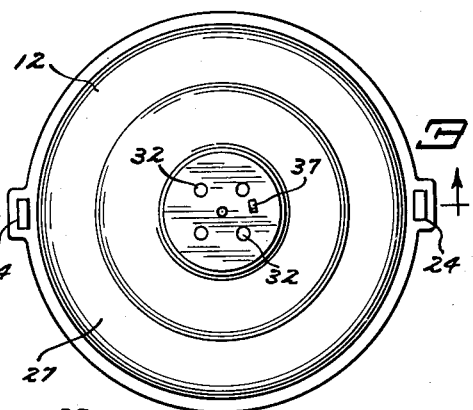
FIG. 2
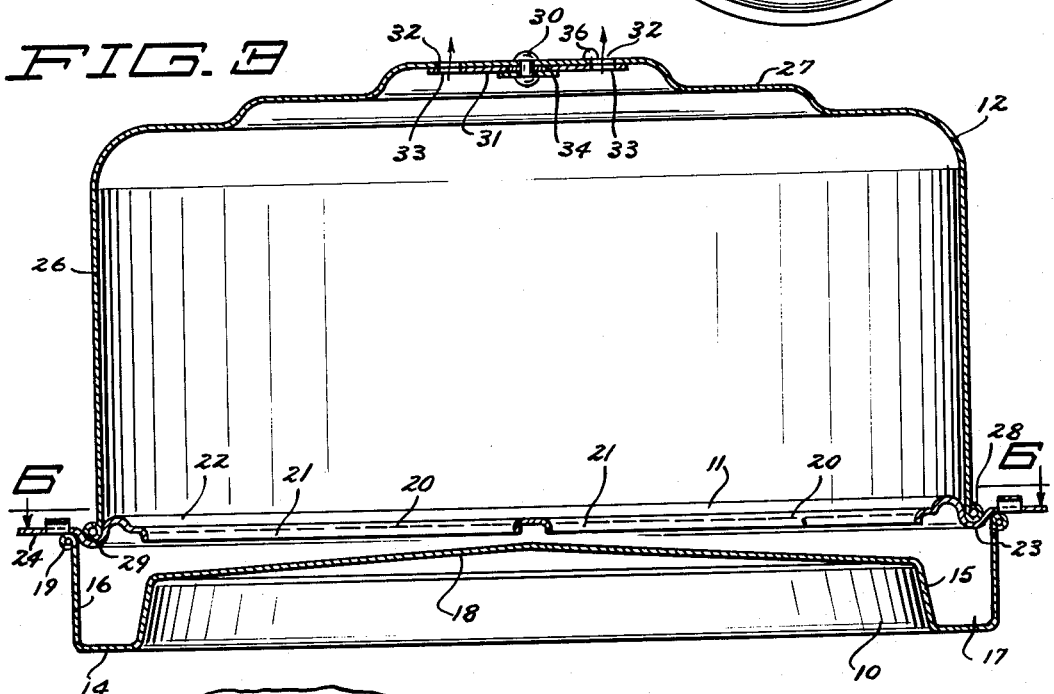
FIG. 3
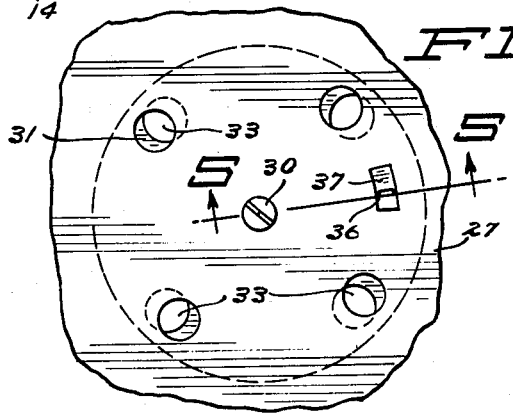
FIG. 4
FIG. 5
INVENTOR.
LOUIS A. LA FOND
BY
Braddock and Braddock
ATTORNEYS April 24, 1956 L. A. LA FOND 2,742,850
APPARATUS FOR COOKING AND SERVING FOODS
Filed March 25, 1953 2 Sheets-Sheet 2
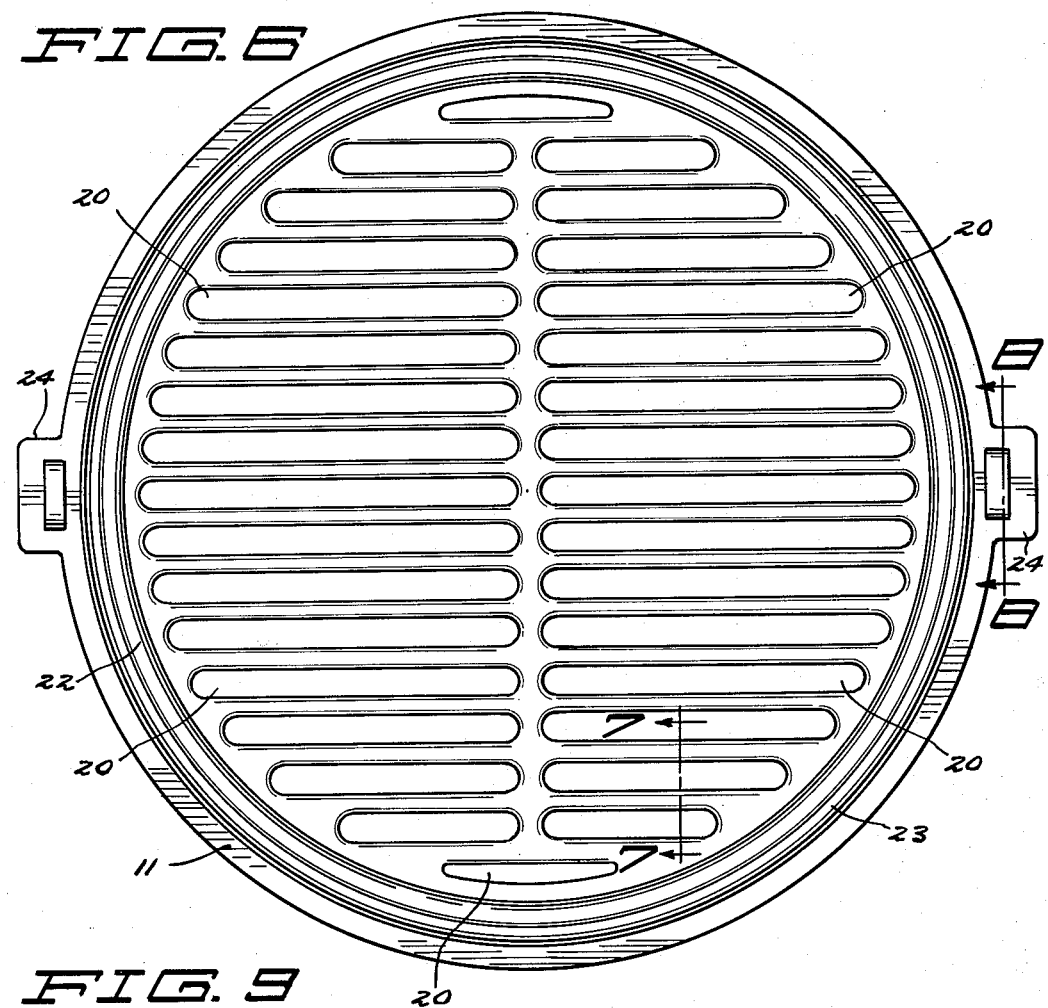
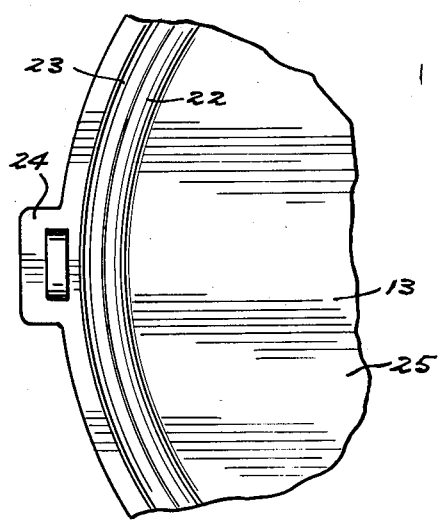
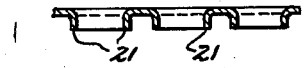
INVENTOR.
LOUIS A. LA FOND
BY
Braddock and Braddock
ATTORNEYS

United States Patent Office 2,742,850
Patented Apr. 24, 1956

2,742,850

APPARATUS FOR COOKING AND SERVING FOODS

Louis A. La Fond, Minneapolis, Minn.

Application March 25, 1953, Serial No. 344,631

4 Claims. (Cl. 99—446)

The invention herein has relation to an apparatus constituted as a plurality of separate utensils capable of use in several different combinations in the art of cooking and serving foods.

The purpose or object of the invention is to provide an apparatus of the character as stated wherein will be incorporated various novel and improved features and characteristics of construction.

In the accompanying drawings forming a part of this specification,

Fig. 1 is a side elevational view of an apparatus for cooking and serving foods made according to the invention;

Fig. 2 is a top plan view of the apparatus of Fig. 1;

Fig. 3 is an enlarged vertical central sectional view, taken on line 3—3 in Fig. 2;

Fig. 4 is an enlarged fragmentary top plan view disclosing a central portion of a circular wall of a cover member of the apparatus including a construction and arrangement for controllably venting said cover member;

Fig. 5 is a detail sectional view, taken on line 5—5 in Fig. 4;

Fig. 6 is a top plan view of a gridiron or grill of the apparatus, as said gridiron or grill would appear from the position of line 6—6 in Fig. 3;

Fig. 7 is a detail sectional view, taken on line 7—7 in Fig. 6;

Fig. 8 is a detail sectional view, taken on line 8—8 in Fig. 6; and

Fig. 9 is a fragmentary top plan view of a spider which can be employed in the apparatus as a substitute for the gridiron or grill of Fig. 6.

Speaking generally, the new and improved apparatus includes a frying pan 10, a gridiron or grill 11 and a cover member 12. As a substitute or replacement for the gridiron or grill, a spider 13, shown in Fig. 9, can be employed.

The frying pan 10 is capable of employment separately, while apart from the remainder of the apparatus, or with other elements of said apparatus. When employed with the gridiron or grill 11, or with the spider 13, said frying pan is a base member of the apparatus upon which said gridiron or grill, or said spider, rests.

A lower, horizontal, annular base wall of the frying pan 10 is denoted 14, a circular interior wall extending upwardly from an inner circular margin of the base wall 14 is represented 15, and a circular exterior wall extending upwardly from an outer circular margin of said base wall 14 is indicated 16. The circular interior wall 15 slants generally upwardly and inwardly, the circular exterior wall 16 slants generally upwardly and outwardly, and, together, the annular base wall 14, said circular interior wall 15 and said circular exterior wall 16 provide an annular well 17.

The circular interior wall 15 integrally supports a substantially horizontal circular wall 18 which is higher at its central portion than at its circumference. Stated differently, the circular wall 18 extends smoothly downwardly from the center thereof to the upper marginal edge of the circular interior wall 15 and provides an upwardly facing surface which slants downwardly and outwardly in all directions from its center toward and to its circumferential margin.

The circular exterior wall 16 continues upwardly to position somewhat above the elevation of the substantially horizontal, circular wall 18, and terminates in a circular bead 19 provided for the purpose of supporting the gridiron or grill 11, or the spider 13, as the case may be, above and in spaced relation to said substantially horizontal, circular wall 18.

The gridiron or grill 11 is a grated utensil for supporting foods to be broiled. As disclosed, said gridiron or grill is a substantially flat, circular member having a plurality of slots 20 in the body thereof. Desirably, the slots 20 may be provided by striking material downwardly from the gridiron or grill in such manner that the downward struck portions of material will in fact serve as strengthening or reinforcing ribs 21 of said gridiron or grill.

A circular interior bead or protuberance projecting upwardly from the gridiron or grill 11 is denoted 22, and a circular exterior bead or protuberance projecting downwardly from a portion of said gridiron or grill disposed outwardly of and adjacent to the interior bead or protuberance 22, is indicated 23. The circular bead 19 at the upper edge of the circular exterior wall 16 supports a lower circumferential surface of the gridiron or grill 11 in such manner that the downwardly projecting, exterior bead or protuberance 23 is situated inwardly and below the elevation of and in proximate relation to said circular bead 19. Handle pieces upon the gridiron or grill 11, in diametrically opposed relation and at the outer side of the bead or protuberance 22 and the bead 19, are designated 24.

The construction and arrangement will be such that when the gridiron or grill 11 is supported upon the frying pan 10, the grated portion of said gridiron or grill will be in substantially parallel, slightly spaced relation to the circular wall 18 of said frying pan, desirably about as disclosed in Fig. 3 of the drawings.

The spider 13, disclosed in Fig. 9, will be of the same construction as is the gridiron or grill 11, except that the body 25 of said spider will be without slots; that is, the body of the spider 13 will be flat and unbroken. Said spider will be capable of assembly with and disassembly from the frying pan 10 in substantially the same manner as is the gridiron or grill 11.

The cover member 12 consists of a cylindrical shell 26 open at its lower end and closed at its upper end by a substantially horizontal, circular wall 27 integral with the upper circular margin of said cylindrical shell. A circular bead 28 upon the lower, open end of the cylindrical shell 26 is supported in a circular depression 29 in the gridiron or grill 11 directly above the circular exterior bead or protuberance 23 when the cover member is removably mounted upon said gridiron or grill, or upon the spider 13, in such manner that the upwardly projecting, interior bead or protuberance 22 is situated inwardly and above the elevation of and in proximate relation to said circular bead 28.

A central portion of the circular wall 27 of the cover member 12 rotatably supports, as at 30, a disc 31 situated within said cover member in proximate relation to said circular wall and has circumferentially spaced perforations 32 therethrough. The disc 31 has circumferentially spaced perforations 33 to be adjustably alined or moved out of alinement with the spaced perforations 32. A first washer 34 is for supporting the disc 31 upon its axis 30, a second washer 35 is situated upon said axis within said disc, and a finger piece 36 upon the disc and within an elongated slot 37 in the horizontal circular wall 27 constitutes an element by employment of which said disc can be rotatably adjusted. Plainly, the disc, etc., as fully described constitutes a construction and arrangement for controllably venting the cover member 12.

The apparatus of the invention can be used for various purposes. By way of example, strips of bacon, or other food, can be laid out upon the substantially horizontal, circular wall 18 of the frying pan 10 when used alone, without other elements of said apparatus, and there fried. During the frying operation, extruded fat or grease will find its way into the annular well 17 provided by the walls 14, 15 and 16 of said frying pan.

Foods can be placed upon the gridiron or grill 11, either with the cover member 12 removed, or applied to said gridiron or grill to provide therewith an oven, and broiled; that is, cooked by direct exposure to radiant heat. Or foods can be placed upon the spider 13 while upon the base member 10 and cooked, either with the cover member 12 applied or removed.

Foods such as frankfurters may be placed upon the gridiron or grill 11 and subjected to steam resulting from the heating of water deposited in the annular well 17.

Various other uses may be made of the apparatus and its several different utensils. For instance, the gridiron or grill 11, or the spider 13, can be employed with the cover member 12, without the frying pan 10, to provide a cake server, so-called.

What is claimed is:

1. A frying pan comprising a lower, horizontal, annular base wall, a continuous interior wall extending upwardly from an inner margin of said base wall, a continuous exterior wall extending upwardly from an outer margin of the base wall, said annular base wall, continuous interior wall and continuous exterior wall together providing an annular well and said continuous exterior wall extending to elevation above said continuous interior wall and a substantially horizontal, continuous wall at elevation below that of the upper edge of said exterior wall higher at its central portion than at its perimeter integral with an upper marginal edge of said continuous interior wall and extending smoothly downwardly from said central portion and providing an upwardly facing, flat unbroken surface slanting downwardly and outwardly in all directions toward and to its perimeter, and a horizontally disposed cooking utensil supported upon an upper marginal edge of said continuous exterior wall above and in spaced, adjacent relation to said substantially horizontal continuous wall.

2. A frying pan constituted as a lower, horizontal, annular base wall, a continuous interior wall extending upwardly from an inner margin of said base wall, a continuous exterior wall extending upwardly from an outer margin of the base wall, said annular base wall, continuous interior wall and continuous exterior wall together providing an annular well and said continuous exterior wall extending to elevation above said continuous interior wall and a substantially horizontal continuous wall at elevation below that of the upper edge of said exterior wall higher at its central portion than at its perimeter integral with an upper marginal edge of said continuous interior wall and extending smoothly downwardly from said central portion and providing an upwardly facing, flat, unbroken surface slanting downwardly and outwardly in all directions toward and to its perimeter, and a horizontally disposed cooking utensil having an outer margin thereof supported upon an upper marginal edge of said continuous external wall above and in spaced, adjacent relation to said substantially horizontal, continuous wall, there being a downwardly projecting element upon the cooking utensil situated inwardly and below the elevation of and in proximate relation to said upper marginal edge of the continuous external wall of said frying pan.

3. A frying pan constituted as a lower, horizontal, annular base wall, a continuous interior wall extending upwardly from an inner margin of said base wall, a continuous exterior wall extending upwardly from an outer margin of the base wall, said annular base wall, continuous interior wall and continuous exterior wall together providing an annular well and said continuous exterior wall extending to elevation above said continuous interior wall and a substantially horizontal continuous wall at elevation below that of the upper edge of said exterior wall higher at its central portion than at its perimeter integral with an upper marginal edge of said continuous interior wall and extending smoothly downwardly from said central portion and providing an upwardly facing, flat, unbroken surface slanting downwardly and outwardly in all directions toward and to its perimeter, a horizontally disposed cooking utensil having an outer margin thereof supported upon an upper marginal edge of said continuous external wall above and in spaced, adjacent relation to said substantially horizontal, continuous wall, and a cover member consisting of a continuous shell having an open lower end thereof supported upon an outer marginal portion of an upper surface of the horizontally disposed cooking utensil in adjacent relation to said continuous exterior wall and a closed upper end thereof in spaced relation to said horizontally disposed cooking utensil, there being a downwardly projecting element upon the cooking utensil situated inwardly and below the elevation of and in proximate relation to said upper marginal edge of said continuous external wall, an upwardly projecting element upon said cooking utensil situated inwardly and above the elevation of and in proximate relation to a lower marginal edge of said cover member and a depression situated above said downwardly projecting element and exteriorly of said upwardly projecting element in which a lower end portion of said cover member is seated.

4. The combination as specified in claim 3, and means for controllably venting said cover member.

References Cited in the file of this patent

UNITED STATES PATENTS

| Re. 1,568 | Morrill | Nov. 10, 1863 |
| 26,368 | Morrill | Dec. 6, 1859 |
| 427,519 | Milner | May 6, 1890 |
| 809,639 | Stokoe | Jan. 9, 1906 |
| 836,983 | Millwee | Nov. 27, 1906 |
| 1,733,450 | Detwiler | Oct. 29, 1929 |
| 1,802,005 | Detwiler | Apr. 21, 1931 |
| 2,262,302 | Sinclair | Nov. 11, 1941 |
| 2,604,033 | Chadwick et al. | July 22, 1952 |